(12) United States Patent
Huffman (10) Patent No.: US 11,346,073 B2
(45) Date of Patent: May 31, 2022

(54) MATERIAL LOADING APPARATUS (71) Applicant: James Rodney Huffman, Roanoke, VA (US)

(72) Inventor: James Rodney Huffman, Roanoke, VA (US)

(*) Notice: Subject to any disclaimer, the term of this patent is extended or adjusted under 35 U.S.C. 154(b) by 436 days.

(21) Appl. No.: 16/294,452

(22) Filed: Mar. 6, 2019

(65) Prior Publication Data

US 2020/0283987 A1  Sep. 10, 2020

(51) Int. Cl.
*E02F 3/02* (2006.01)
*B62B 1/14* (2006.01)

(52) U.S. Cl.
CPC .............. *E02F 3/02* (2013.01); *B62B 1/147* (2013.01)

(58) Field of Classification Search
CPC .............. E02F 3/02; B62B 1/147; E01H 5/02
USPC .......................................................... 37/434
See application file for complete search history.

(56) References Cited

U.S. PATENT DOCUMENTS

| | | | |
|---|---|---|---|
| 2,544,505 A | | 3/1951 | Kronhaus |
| 2,930,152 A | | 3/1960 | Pipkin |
| 3,017,710 A | * | 1/1962 | Carlson .................. B62B 1/147 37/434 |
| 3,028,695 A | * | 4/1962 | Westby .................. B62B 1/147 37/434 |
| 3,043,033 A | * | 7/1962 | Odell ....................... E01H 5/02 37/434 |
| 3,107,446 A | * | 10/1963 | Messinger ............... E01H 5/02 37/434 |
| 3,154,336 A | * | 10/1964 | Clarence ................ E01H 5/02 37/265 |
| 4,224,751 A | | 9/1980 | Schoemann et al. |
| 4,302,894 A | * | 12/1981 | Emma .................... B62B 1/147 298/2 |
| 5,018,282 A | * | 5/1991 | Hong ..................... B62B 1/147 37/265 |
| 5,048,206 A | * | 9/1991 | Jones ....................... E01H 5/02 37/265 |
| 7,681,932 B2 | * | 3/2010 | Chang ..................... E01H 5/02 294/54.5 |
| 2003/0095857 A1 | | 5/2003 | Degleman |
| 2007/0113430 A1 | | 5/2007 | Chang |

FOREIGN PATENT DOCUMENTS

| | | | | |
|---|---|---|---|---|
| CA | 2323917 A1 | * | 4/2002 | ............ B62B 1/147 |
| FR | 2790726 A1 | * | 9/2000 | ............... B62B 1/14 |

* cited by examiner

*Primary Examiner* — John D Walters
*Assistant Examiner* — Hilary L Johns
(74) *Attorney, Agent, or Firm* — Muncy, Geissler, Olds & Lowe, P.C.8

(57) ABSTRACT

A loader includes a support frame, having a handle disposed at a first end and a pair of wheels, connected by an axle, disposed at a second end, a ratchet column disposed between the pair of wheels along the axle, including a plurality of grooves, a bucket lift frame secured to the support frame at a first end of the bucket lift frame, a ratchet column pin, configured to releasably engage the plurality of grooves, secured to the bucket lift frame, a loading bucket pivotably secured to a second end of the bucket lift frame, a bucket dump lever pivotably secured to the bucket lift frame and a bucket control arm secured at a first end to the loading bucket and at a second end to the bucket dumper lever. The bucket dump lever is configured to move the loading bucket from a loading position to a dumping position.

16 Claims, 12 Drawing Sheets

MATERIAL LOADING APPARATUS

BACKGROUND OF THE INVENTION

Field of the Invention

The present invention relates to a material loading apparatus and, more particularly, a manual, hand operated, adjustable material loading apparatus.

Description of the Background Art

Individuals, such as homeowners, farmers, landscapers and contractors, are often in a situation in which they must transport large amounts of heavy, loose material. The loose material could include gravel, dirt, snow, sand, etc. Typically, such material is transported by a conventional wheelbarrow. Conventional wheelbarrows require a user to lift or shovel heavy material into the bucket of the wheelbarrow. Some conventional devices have been designed to limit the lifting of heavy material by a user into a wheelbarrow or other loading device.

U.S. Pat. No. 2,544,505 discloses a self-loading wheelbarrow. The self-loading wheelbarrow has a scoop that is able to be lifted. The scoop is lifted using a configuration of components including a motor and a hydraulic pump.

U.S. Pat. No. 2,930,152 discloses a wheeled shovel. The wheeled shovel has a shovel/scoop portion that allows a user to dig into a surface to load material into the scoop. Wheels are provided along a bottom of the shovel/scoop portion. A handle extends from the shovel/scoop portion to allow a user to tilt the device and move the shovel by steering the wheels.

U.S. Patent Application Publication No. 2007/0113430 discloses a stationary shoveling and throwing device. The device includes a shovel blade configured to scoop material. The device further includes user operable levers that allow the user to lift the scoop and the material held by the scoop.

U.S. Pat. No. 4,224,751 discloses a snow lifting device. The snow lifting device includes a scoop/shovel that may be moved from a loading position to a dumping position by operating a handle secured to the scoop/shovel.

U.S. Patent Application Publication No. 2003/0095857 discloses a personal loader. The personal loader is configured to have a variety of tools interchangeably secured to a front of the loader. The loader is powered by a motor and includes a drive unit with a simplified hydrostatic differential to allow for easy maneuverability.

U.S. Pat. No. 5,048,206 discloses a snow shoveling device. The device includes a snow shovel mounted on a cart for scooping and moving snow. The device includes a handle for lifting the shovel from a scooping position to a dumping position.

Typical conventional material loading devices are often cumbersome and difficult for a user to maneuver. Additionally, such devices typically require motors or other complex components to operate. There is currently a need for a material loading apparatus that is manually operable that allows a user to easily load and transport a variety of materials without any heavy lifting by the user.

SUMMARY OF THE INVENTION

In view of the foregoing and other exemplary problems, drawbacks, and disadvantages of the conventional methods and compositions, an exemplary feature of the present invention is to provide a manual, hand-operated material handling apparatus, which allows a user to easily load, lift and transport large amounts of loose material. The present invention provides a device that requires minimal lifting. Furthermore, the present invention provides a device in which all of the work is done by pressing down on a handle of the material handling apparatus.

In accordance with a first exemplary, non-limiting aspect of the present invention, a material handling apparatus includes a frame, a bucket pivotably secured to the frame and a bucket control member secured to the bucket and configured to move the bucket from a loading position to a dumping position.

In accordance with a second exemplary, non-limiting aspect of the present invention, an adjustable material handing apparatus includes a main support frame, having a main support frame handle disposed at a first end of the main support frame and a pair of wheels, connected by an axle, disposed at a second end of the main support frame, a ratchet column disposed between the pair of wheels along the axle, the ratchet column comprising a plurality of grooves, a height-adjustable bucket lift frame movably secured to the main support frame at a first end of the bucket lift frame, a ratchet column pin, configured to releasably engage the plurality of grooves, secured to the bucket lift frame, a loading bucket pivotably secured to a second end of the bucket lift frame, a bucket dump lever pivotably secured to the bucket lift frame and a bucket control arm secured at a first end to the loading bucket and at a second end to the bucket dumper lever. The bucket dump lever is configured to move the loading bucket from a loading position to a dumping position.

In accordance with the above exemplary aspects of the present invention, a user is able to easily load, lift and transport large amounts of loose material. Additionally, the apparatus of the present invention is entirely manually operated and does not require any hydraulics or motors. Thus, the apparatus does not create any noise, does not require any fuel or electricity and does not produce any exhaust fumes. The apparatus of the present invention requires minimal lifting as all of the work is down by merely pressing down on the handle. Specifically, minimal lifting is required to activate the apparatus as load lifting is accomplished by pushing down on a hand placement area on the handle and then load transporting is accomplished by pushing the apparatus to a desired load placement location. The entire transporting process is accomplished without any lifting required by the user. Additionally, the apparatus of the present invention is entirely portable. Also, the apparatus of the present invention, since entirely manually operated, is quiet thus allowing the apparatus to be used, for example, around livestock. Finally, the apparatus does not require any special training to operate.

BRIEF DESCRIPTION OF THE DRAWINGS

The present invention will become more fully understood from the detailed description given herein below and the accompanying drawings which are given by way of illustration only, and thus, do not limit the present invention, and wherein.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIGS. 1-5C illustrate certain exemplary embodiments of the present invention. As is detailed in FIGS. 1-5C, exemplary embodiments of the present invention are directed to a material handling apparatus 100. According to certain exemplary aspects of the invention, the material handling apparatus 100 is directed to a material handling loader configured to move or load loose material such as, for example, gravel, sand, snow, dirt, etc. The material handling apparatus 100 as described herein is directed to a manual loading apparatus that does not require hydraulics, gas or electric motors, or any other mechanical or electrical automation.

Turning to FIGS. 1-4, the material handling apparatus 100 includes a main support frame 110. The main support frame 110 includes two, parallel disposed, elongate frame rods 112. The main support frame 110 further includes a generally U-shaped handle 114 secured to a first end of each of the frame rods 112. The handle 114 has two ends 114a having openings for receiving upper ends 112a of each of the frame rods 112. The handle is manually operable and is configured to receive pushing and pulling force from a user gripping the handle 114, to move the material handling apparatus 100 in forward and rearward directions, and lifting force from a user gripping the handle 114, to pivotably raise and lower the material handling apparatus 100.

The material handling apparatus 100 further includes a pair of wheels 120 disposed at an end of the main support frame 110 opposite to the handle 114. The wheels 120 are mounted on opposing ends of an axle 122. Lower ends 112b of each frame rod 112 are mounted to the axle 122 between the pair of wheels 120. The wheels 120 are configured to allow the material handling apparatus 100, upon application of a pushing and/or a pulling force from a user, to easily move along a traversable surface. The wheels 120 are steerable by the handle 114 to guide the motion of the material handling apparatus 100.

The main support frame 110 also includes at least one lower support member 116 configured to support the main support frame 110 in an elevated position when the material handling apparatus is not being actively used. In the exemplary embodiment illustrated in FIG. 1, the main support frame 110 includes two lower support members 116. Each of the lower support members 116 is respectively attached to one of the frame rods 112 at a position between the handle 114 and the wheels 120. In the exemplary embodiment illustrated in FIG. 1, the lower support members 116 are configured as generally U-shaped members connected by a horizontally disposed lower support rod 118. The lower support members 116 and the lower support rod 118 allow the user to maintain the material handling apparatus 100 in a resting position in which the main support frame 110, in particular the handle 114, is maintained in an elevated, easily accessibly position, when the material handling apparatus 100 is not being actively used by the user.

Figure 1:
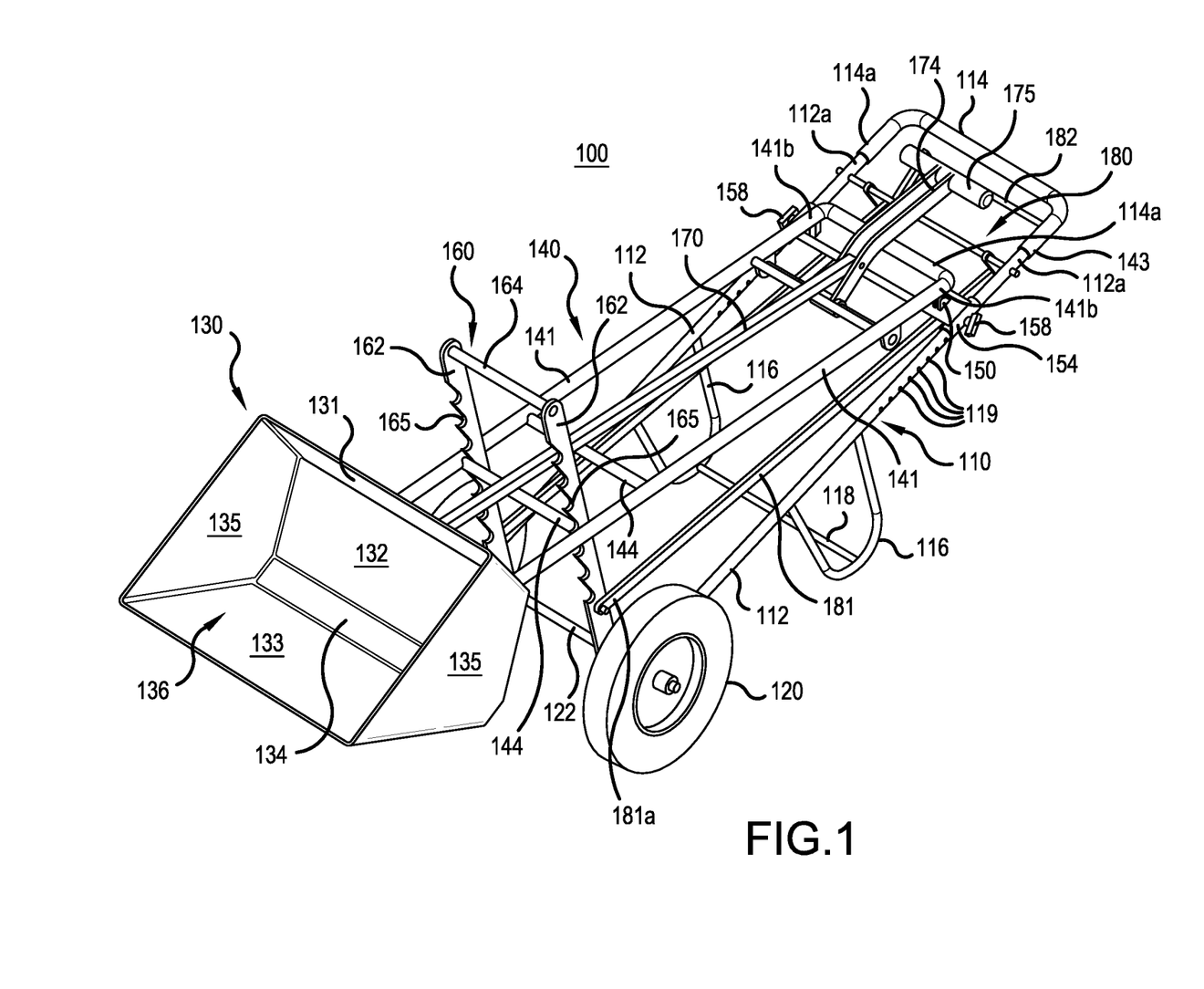
FIG. 1 is a perspective view of a material handling apparatus 100 according to certain exemplary embodiments of the present invention.
Figure 2:
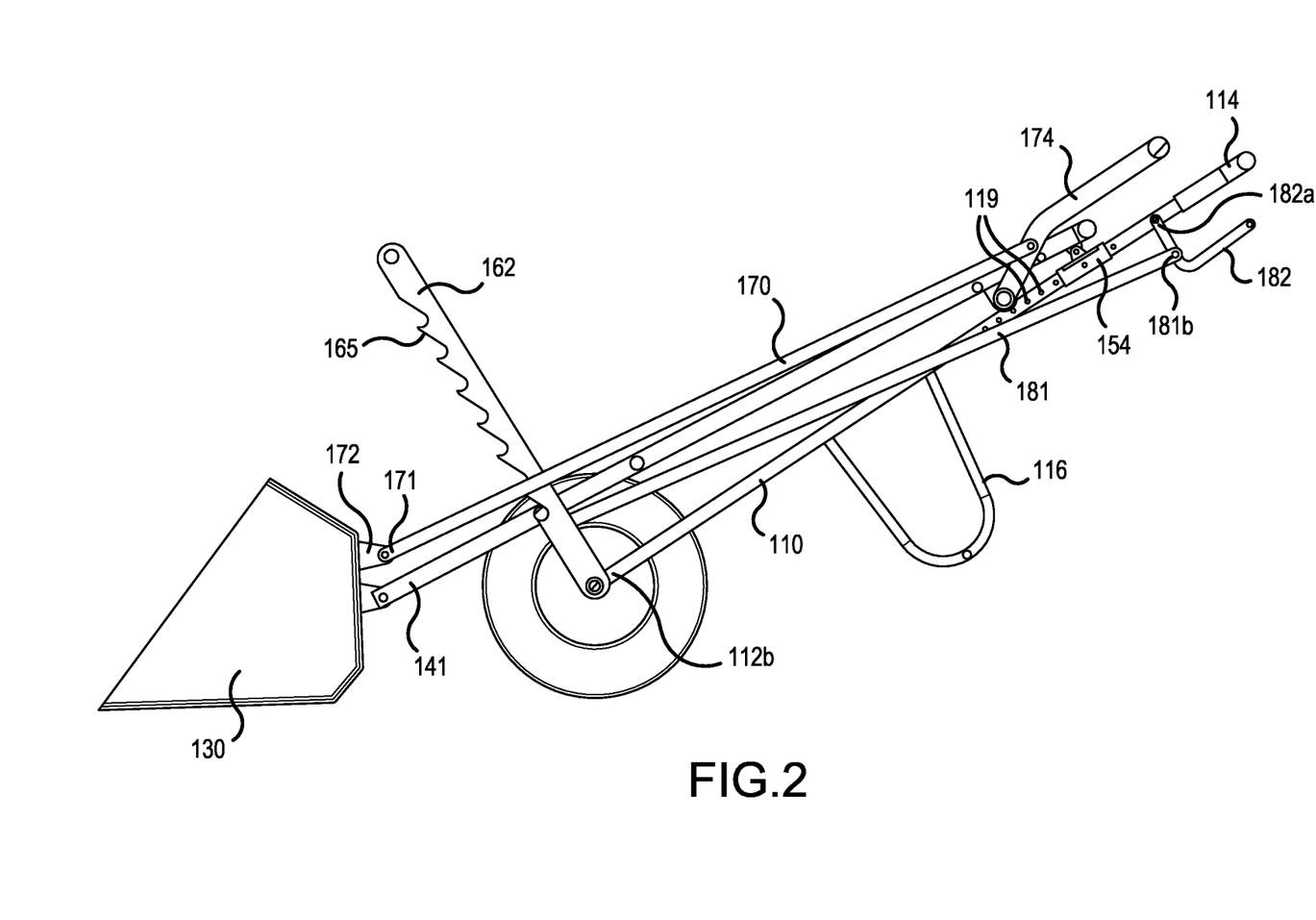
FIG. 2 is a cross-sectional view of the material handling apparatus 100.

The material handling apparatus 110 includes a material loading bucket 130 mounted on a front end of the material handling apparatus 100. The bucket 130 includes an inclined top wall 131, a generally vertically disposed rear wall 132, an inclined bottom wall 133, a connecting wall portion 134, which connects the rear wall 132 to the bottom wall 133, and a pair of side walls 135. The top wall 131, rear wall 132, bottom wall 133, connecting wall 134 and side walls 135 define a loading chamber configured to receive material in the bucket 130. The top wall 131, rear wall 132, bottom wall 133, connecting wall 134 and side walls 135 define a substantially rectangular opening 136 of the bucket 130.

The bucket 130 is mounted to the main support frame 110 by a bucket lift frame 140. The bucket lift frame 140 includes a pair of parallel disposed, elongate lift frame rods 141. Each of the lift frame rods 141 is pivotably connected to an exterior rear surface 137 of the bucket 130. The lift frame rods 141 may be connected to the exterior rear surface 137 in an any manner that allows for pivoting motion of the bucket 130 with respect to the lift frame rods 11. In the embodiment illustrated in FIGS. 1-5C (particularly illustrated in FIG. 5C), a first end 141a of each of the lift frame rods 141 is respectively connected to the exterior rear surface 137 of the bucket 130 by mounting brackets 142.

The bucket lift frame 140 also includes a frame cross bar 143, which is perpendicularly disposed with respect to the lift frame rods 141 and is secured to second ends 141b, opposite to the first ends 141a, of each lift frame rod 141.

The bucket lift frame 140 is mounted on the main support frame 110. The bucket lift frame 140 includes a pair of mounting brackets 143 respectively positioned along each of the lift frame rods 141 adjacent to the second ends 141b thereof. The mounting brackets 143 are positioned along a bottom of the lift frame rods 141 facing the main support frame 110.

A mounting plate 150 is slidably secured to the main support frame 110. The mounting plate 150 includes a rectangular, flat plate body, which extends across the main support frame and is secured to both of the frame rods 112. The mounting plate 150 includes, at each end thereof, a cylindrical mounting portion 154 configured to slidably fit over the frame rods. Additionally, the mounting plate 150 includes a pair of mounting plate brackets 156, which are configured to respectively receive the mounting brackets 143 of the bucket lift frame 140. The mounting brackets 143 engage the mounting plate brackets 156 in a manner that allows the bucket lift frame 140 to pivot with respect to the main support frame 110. Finally, the mounting plate 150 includes a height adjustment knob 158 on each of the cylindrical mounting portions 154. The adjustment knobs 158 are configured to releasably engage a plurality of height adjustment holes 119 disposed along each of the frame rods 112. That is, releasing the adjustment knobs 158 from engagement with the height adjustment holes 119 allows the mounting plate 150 to slidably move along the frame rods 112 to a different position, thus allowing relative movement of the bucket lift frame 140, and thus the bucket 130, with respect to the main support frame 110.

Figures 3, 4:
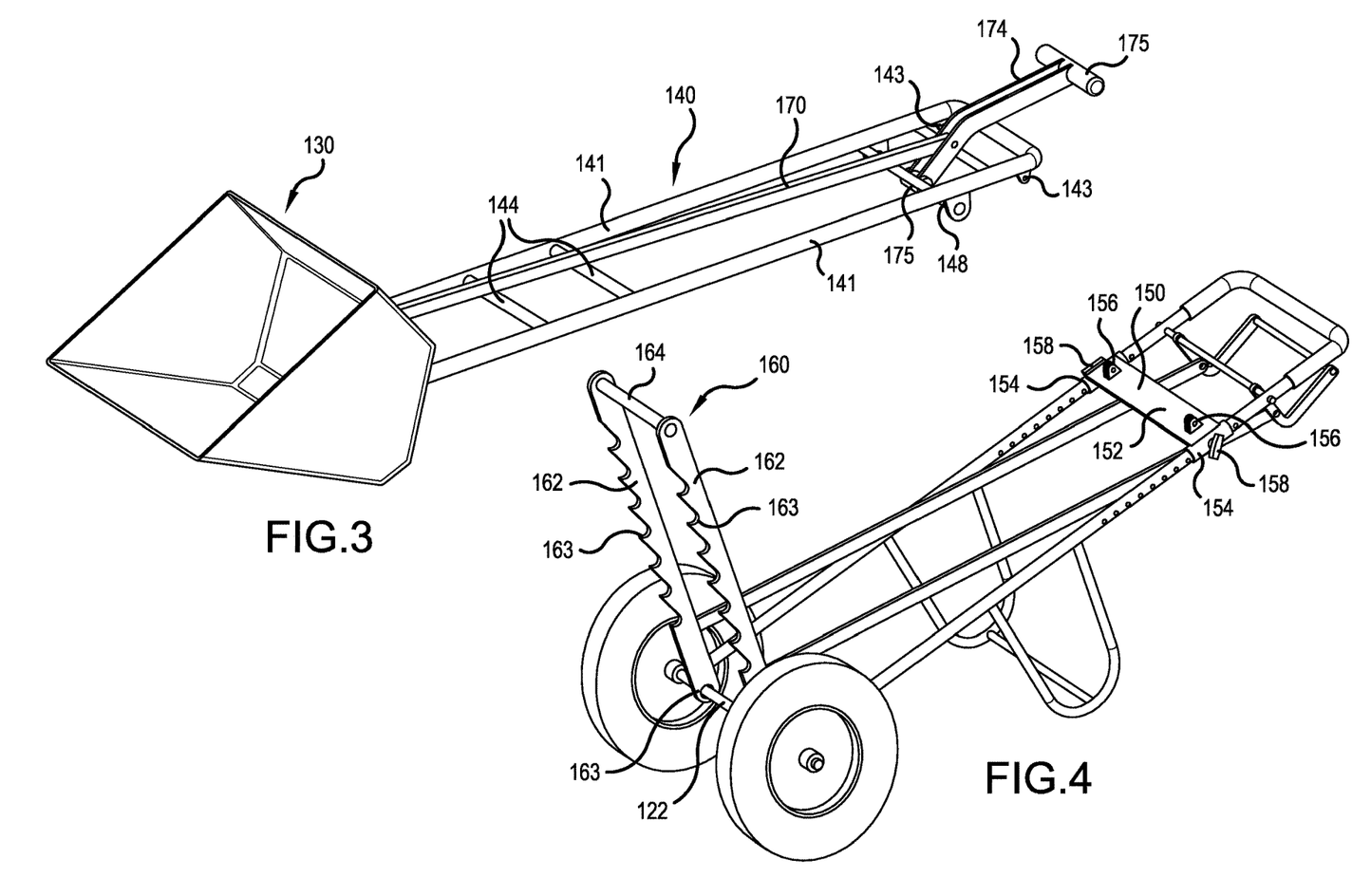
FIG. 3 is a partial perspective view of the material handling apparatus 100.
FIG. 4 is a perspective view of a support frame of the material handling apparatus 100.

The material handling apparatus 100 includes a ratchet column 160, configured to allow a user to manually change the height of the bucket 130. The ratchet column 160 includes two, substantially vertically disposed, column members 162. Each of the column members 162 has a mounting hole 163 for mounting the column members 162 to the axle 122. As is illustrated in FIG. 4, the axle 122 passes through the mounting holes 163. The axle 122 is loosely received within the mounting holes 163 to allow the ratchet column 160 to freely pivot about the axle 122. A cross bar 164 extends between the two column members 162 and is connected at its two ends to a top of the column members 162. Each of the column members 162 includes a plurality of vertically separated grooves 165.

Figures 5A, 5B, 5C:
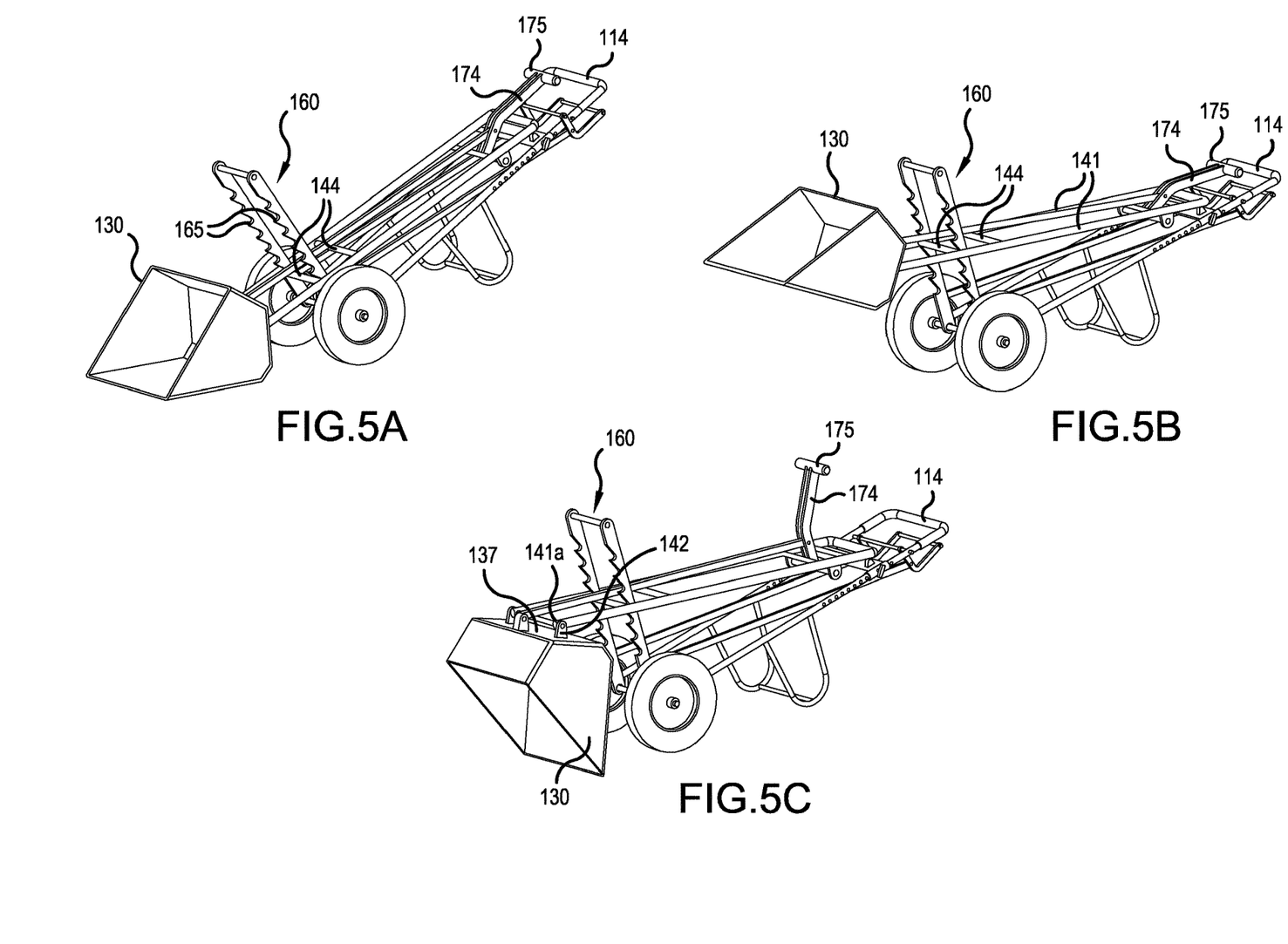
FIGS. 5A-5C are perspective view of the material handling apparatus 100 with a load bucket in varying positions.

The plurality of grooves 165 are configured to releasably receive an engagement pin 144 disposed on the bucket lift frame 140. When the engagement pin 144 is received within the grooves 165 on the ratchet column 160, the bucket lift frame 140 and the bucket 130 are held at a set height. The height of the bucket lift frame 140 and the bucket 130 are adjustable by moving the engagement pin 144 to a different groove 165. FIGS. 5A-5C illustrate the bucket 130 and the bucket lift frame 140 in three various height positions along the ratchet column 160. The height of the bucket lift frame 140 is easily and manually adjusted merely by the user applying a lifting force to the handle 114. When the main support frame 110 is lifted by applying a lifting force to the handle 114, the ratchet column 160 pivots backward. Once the ratchet column 160 pivots backward enough, the engagement pin 144 will slide out from the curved groove 165 on the ratchet column 160 and lock into a next higher groove 165 on the ratchet column 160. The user may then reposition the engagement pin 144 into a higher one of the grooves 165 (as is shown in FIGS. 5A-5C) to adjust the height of the bucket 130 and bucket lift frame 140.

In order to lower the bucket 130 and the support frame 110 after dumping, the handle 114 must be lifted to allow the bucket 130 to touch the ground. Then, the user must depress and hold the handle 182 to pull the ratchet column 160 back free of the engagement pin 144. Then, the user can lower the handle 114 to a desired height, release the handle 182, thus locking the handle 182 into place to reload the material.

In the exemplary embodiment illustrated in FIGS. 1-5C, the bucket lift frame 140 includes two engagement pins 144. Thus, the position of the bucket lift frame 140 and the bucket 130 may be varied, as detailed above, by sliding the mounting plate 150 along the frame rods 112. Thus, the bucket 130 may be moved to a forward position in which the forward most engagement pin 144 engages the ratchet column 160 and a rearward position in which the rearward most engagement pin 144 engages the ratchet column 160.

The material handling apparatus 100 includes a bucket control mechanism for controlling operation and movement of the bucket 130. In the exemplary embodiment illustrated in FIGS. 1-5C, the bucket control mechanism includes a bucket control arm 170. The bucket control arm 170 has an elongate body having a first end 171 pivotably attached to the rear surface 137 of the bucket by a control arm mounting bracket 172. In alternate embodiment, the bucket control arms 170 are replaced with a pair of cables and pulleys. This alternate embodiment is discussed below in further detail with respect to FIGS. 7A-7D.

A bucket dump lever 174 is connected to a second end 173 of the control arm 170. The bucket dump lever 174 includes a cylindrical mounting member 175 that pivotably mounts the bucket dump lever 174 to the bucket lift frame 140. The bucket lift frame 140 includes a dump lever mounting rod 148 that extends between and is attached to the lift frame rods 141. The dump lever mounting rod 148 extends through the cylindrical mounting member 175 with a loose fitting to allow the bucket dump lever 174 to pivot about the dump lever mounting rod 148.

FIGS. 5A-5C illustrate the bucket 130 in three separate positions. FIG. 5A illustrates the bucket 130 in its loading position, in which a user may steer the material handling apparatus 100 toward material to be loaded into the apparatus. In this position, the bucket 130 is positioned in a lowered position in which the bottom surface 133 of the bucket 130 is positioned along a ground surface to be traversed. FIG. 5B illustrates the material handling apparatus 100 when the bucket 130 is in a raised carrying position. In this position, the material has been loaded into the bucket 130 and the height of the bucket 130 has been raised along the ratchet column 160, as detailed above, to allow the user to easily steer the material handling apparatus 100 and transport the material in the bucket 130. FIG. 5C illustrates the material handling apparatus 100 in a material dumping position. In this position, the dump lever 174 is pushed forward and pivots forward about the dump lever mounting rod 148. The dump lever 174 is configured to be moved manually by a user applying a pushing or pulling force on a handle 175 of the dump lever 174. This forward motion of the dump lever 174 causes the bucket control arm 170 to move forward and, by pivoting motion, tilt the bucket 130 into the dumping position illustrated in FIG. 5C. The bucket 130 is returned to its position in FIG. 5B but pulling the handle 175 of the dump lever 174 back to its initial position. The bucket control arm 170 is designed with a 90° downward curve where it connects to the dump lever 174 to allow the dump lever 174 and the handle 175 to move back past 180° to into place when the bucket 130 is raised in a locked and loaded position.

The material handling apparatus 100 also includes a ratchet release mechanism 180. The ratchet release mechanism 180, in accordance with the exemplary embodiment illustrated in FIGS. 1-5C, includes a pair of elongate release arms 181, parallel disposed and extending along the main support frame 110. The release arms 181 are respectively secured at a first end 181a to the column members 162 of the ratchet column 160. The ratchet release mechanism 180 also includes a ratchet release handle 182. The ratchet release handle 182 is attached, at an end 182a thereof, to the frame rods 112 of the main support frame 110. A second end 181b of the release arms 181 is secured to the ratchet release handle 182. To release the ratchet column 160, the bucket 130 must be placed resting on the ground. The user then depresses the release handle 182 to tilt the ratchet column 160 back, thus releasing the engagement pin 144. The handle 114 is then lowered to a comfortable position for loading.

In alternative embodiment, the sliding adjustable mounting plate 150 may be eliminated. In such an embodiment, the pair of mounting plate brackets 156 are permanently welded to the main support frame 110. The pair of mounting plate brackets 156 respectively receive the mounting brackets 143 of the bucket lift frame 140. The mounting brackets 143 engage the mounting plate brackets 156 in a manner that allows the bucket lift frame 140 to pivot with respect to the main support frame 110.

Figure 6:
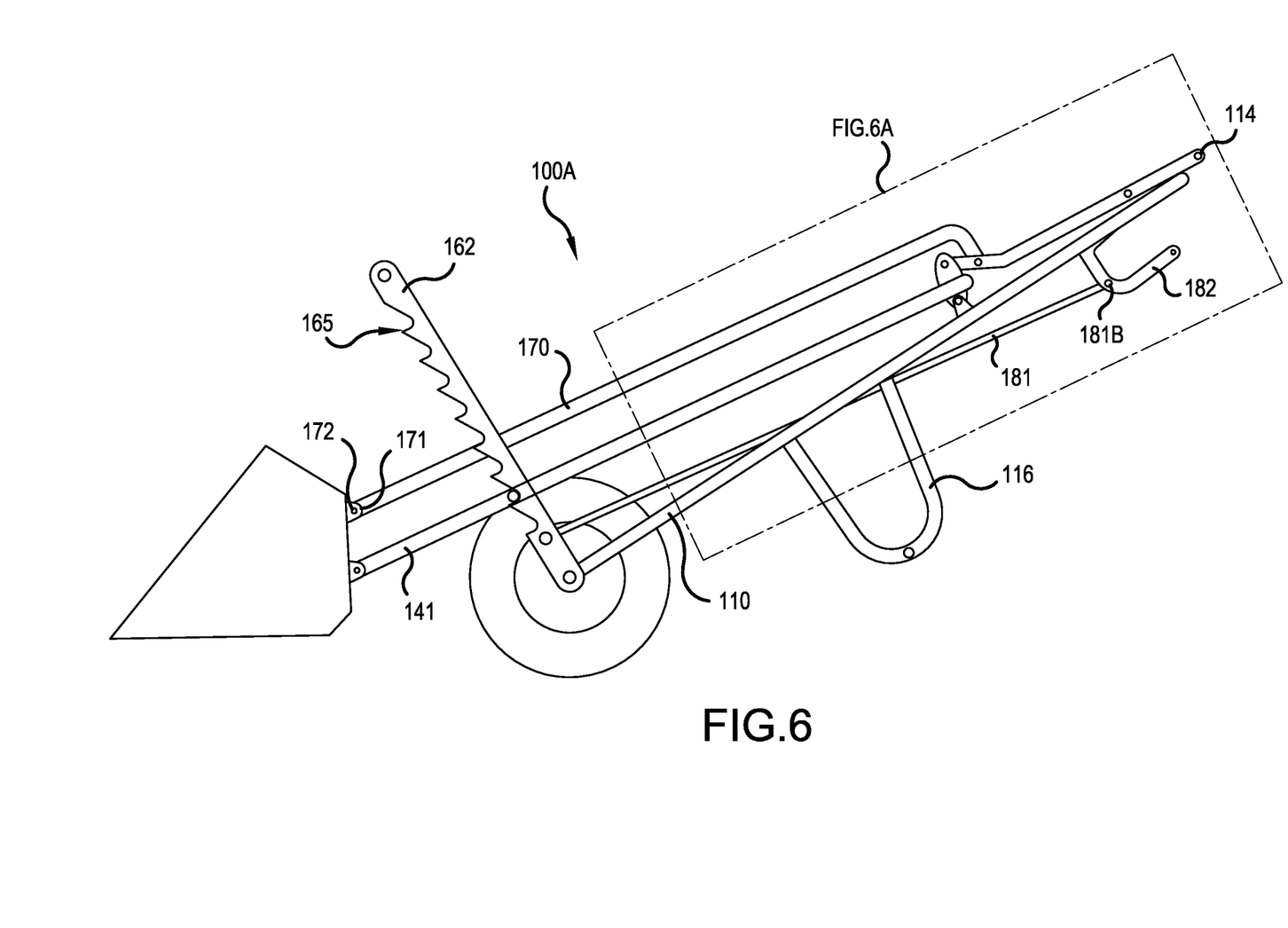
FIG. 6 illustrates a side view of a material handling apparatus 100A according to another exemplary embodiment of the present invention.
Figure 6A:
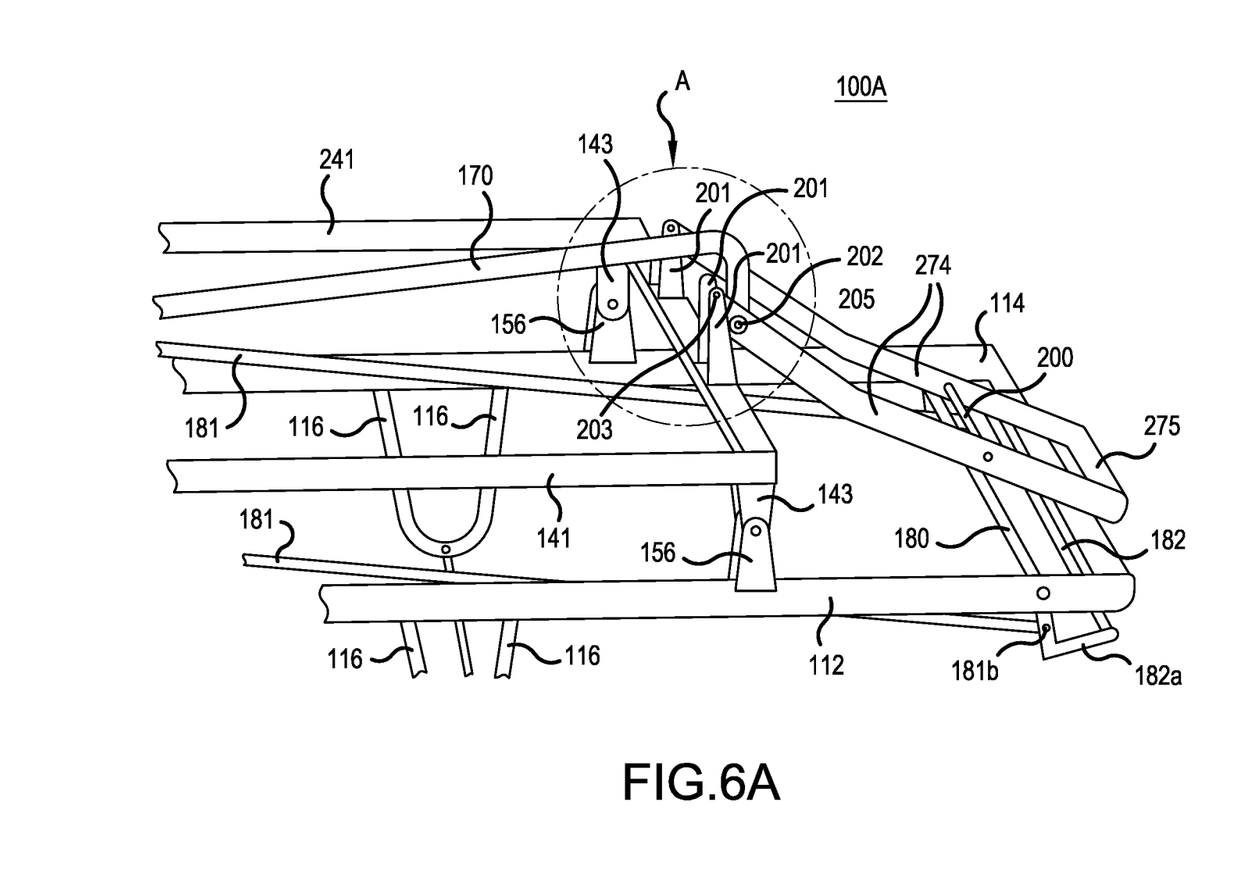
FIG. 6A illustrates a top perspective view of a portion of the material handling apparatus 100A illustrated in FIG. 6.
Figure 6B:
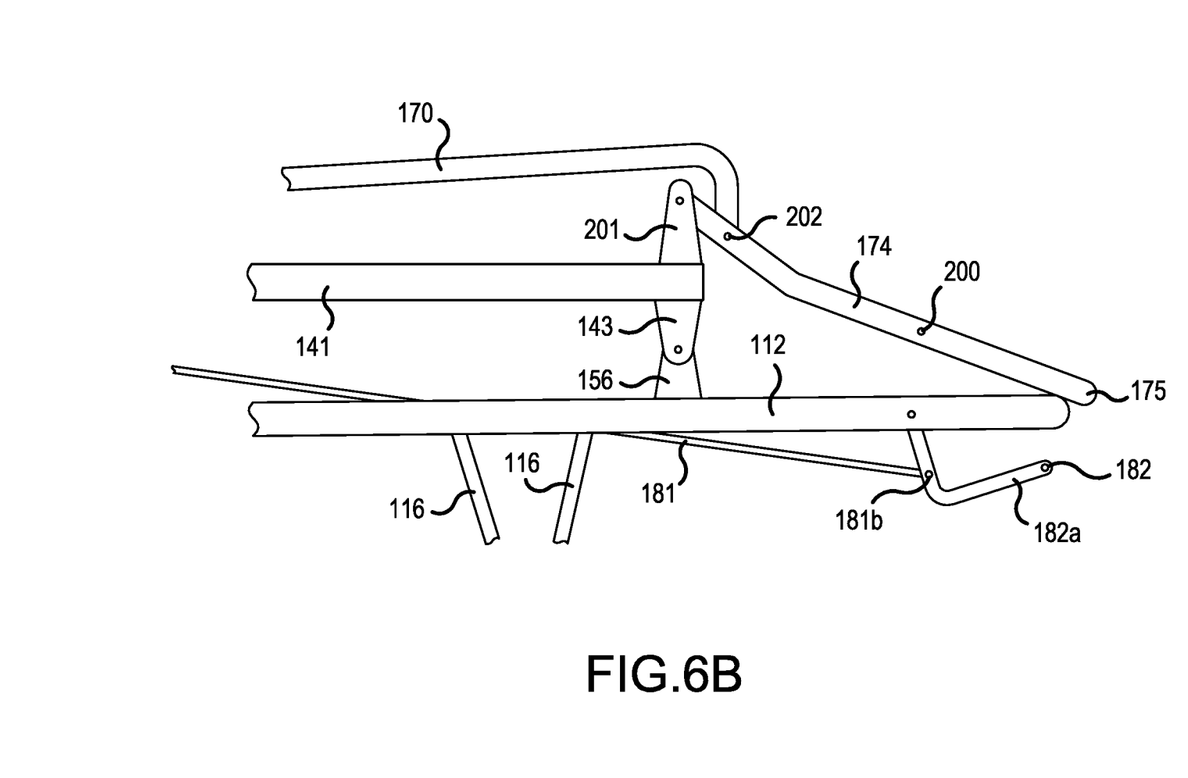
FIG. 6B illustrates a side view of the portion of the material handling apparatus illustrated in FIG. 6A.
Figure 6C:
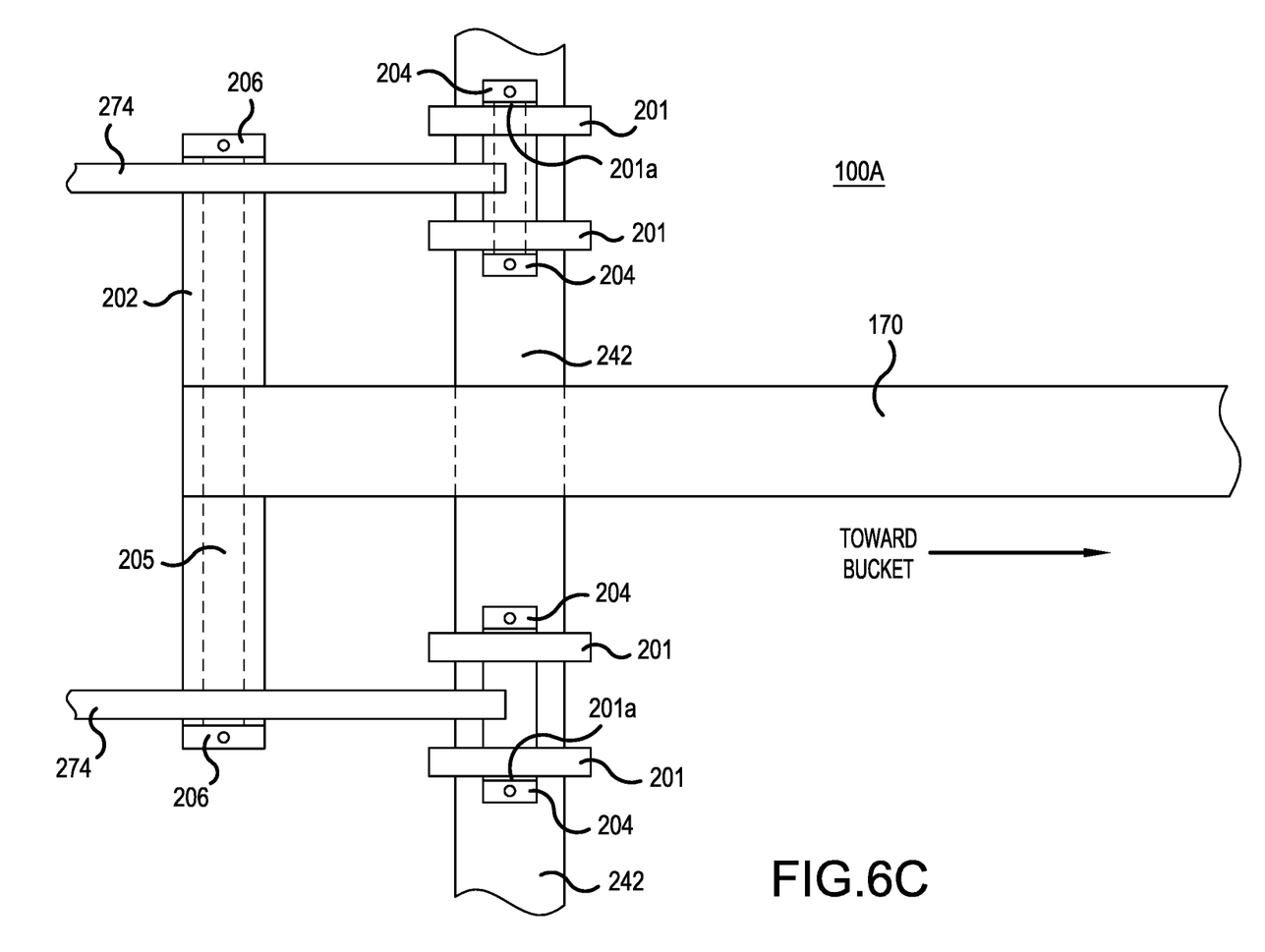
FIG. 6C illustrates a detailed top view of area A in FIG. 6A.
Figure 7A:
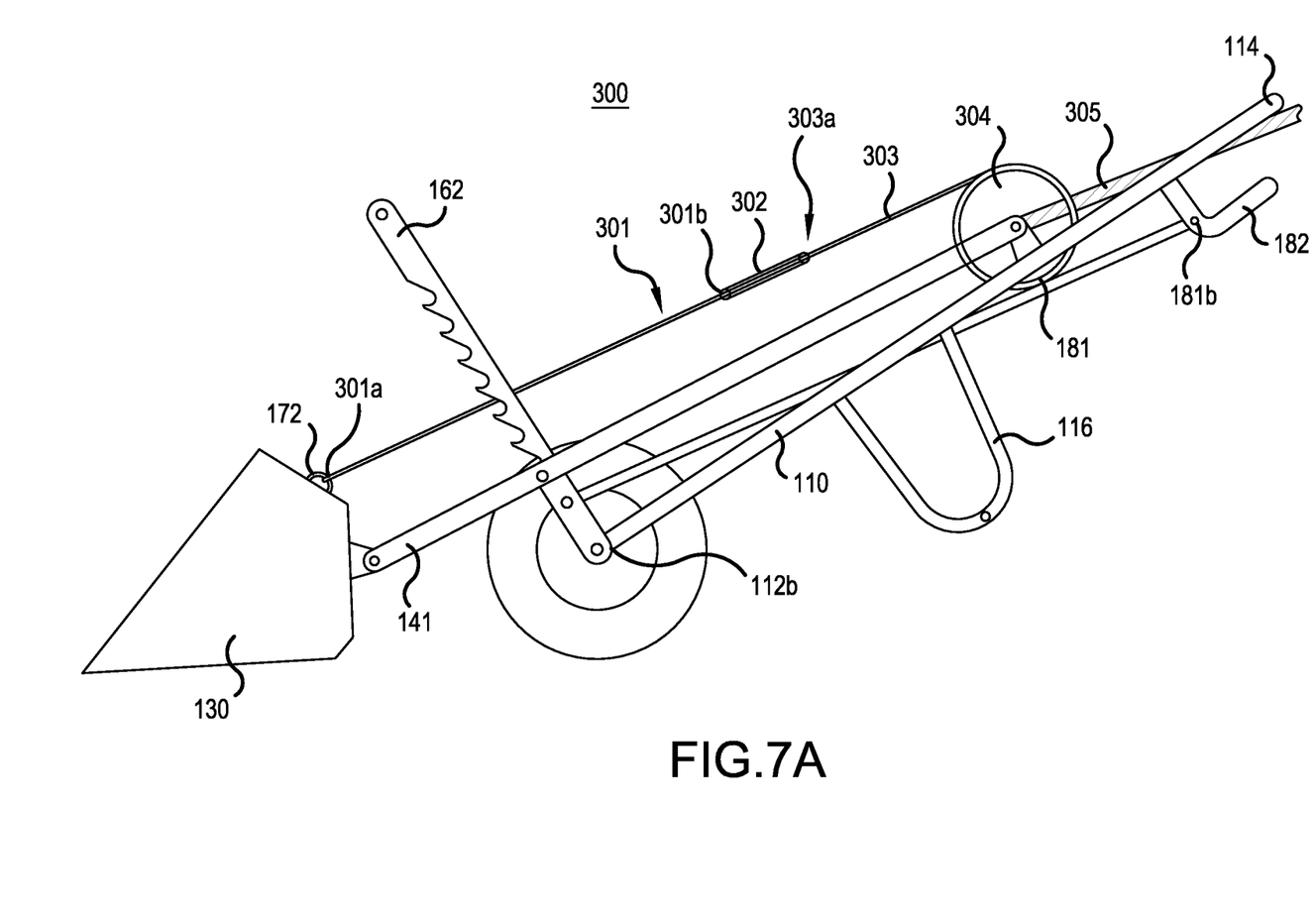
FIG. 7A is a side view of a material handling apparatus 300 according to another exemplary embodiment of the present invention.
Figure 7B:
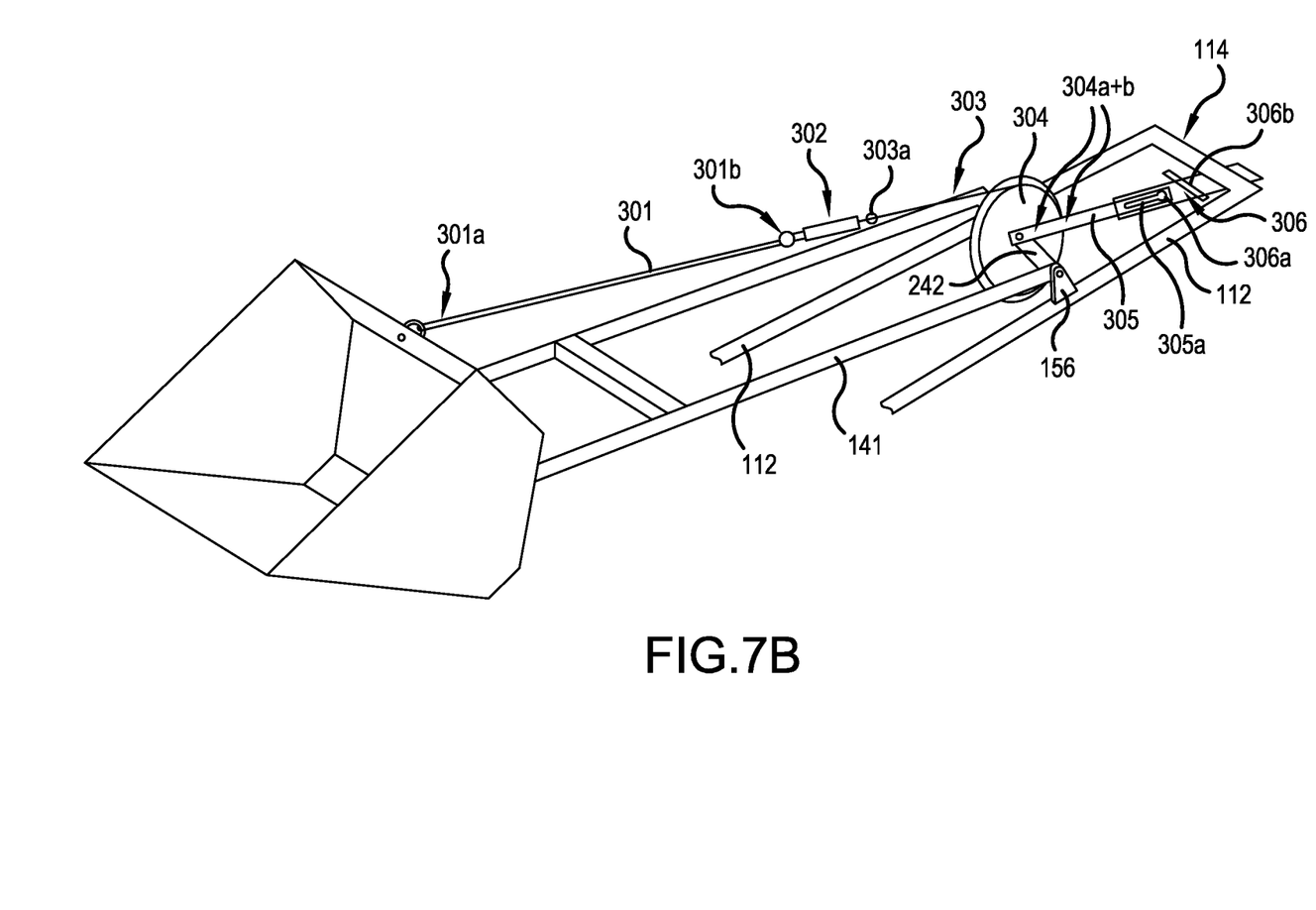
FIG. 7B is a top perspective view of a portion of the material handling apparatus 300.
Figure 7C:
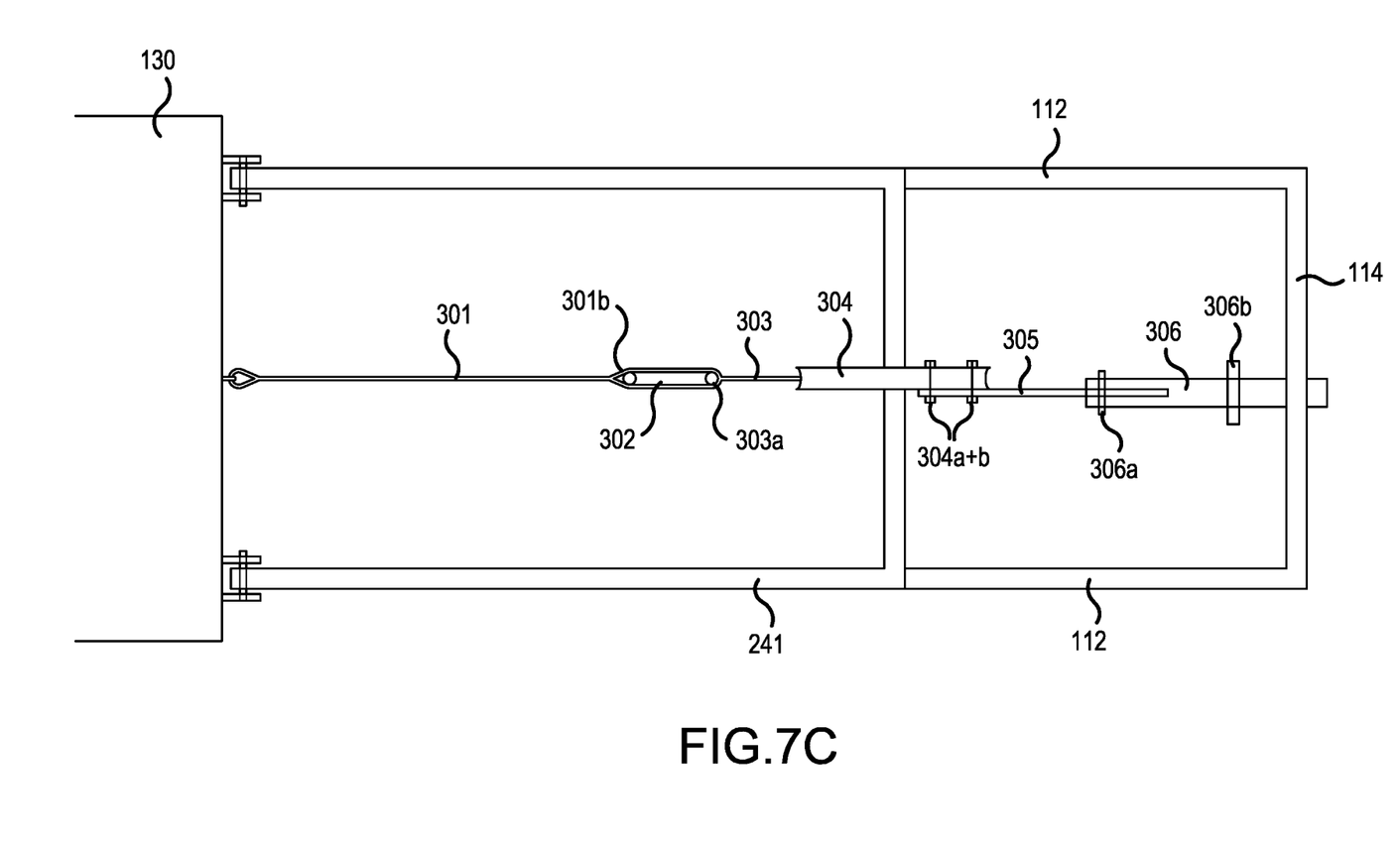
FIG. 7C is a top view of a portion of the material handling apparatus 300.
Figure 7D:
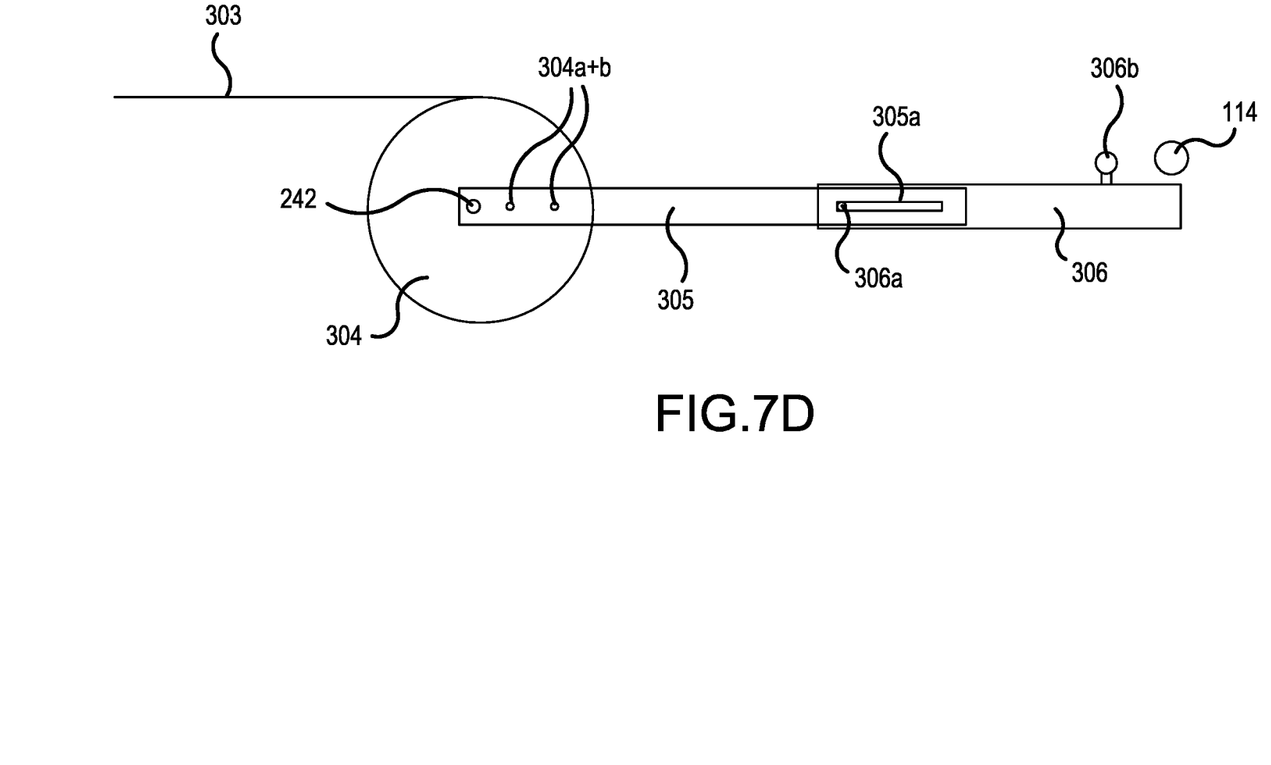
FIG. 7D is a side view of the pulley 304 of the material handling apparatus 300.

Specifically, FIGS. 6-6C illustrate another embodiment of the present invention. The material loading apparatus 100A is substantially similar to the embodiments detailed above. A further detailed description of the same components is not repeated here with respect to FIGS. 6-6C. The difference between this embodiment and the previously discussed embodiments is the manner in which the bucket lift frame 140 is attached to the main support frame 110 and in which the bucket control arm 170 and the bucket dump lever 174 are secured to the bucket lift frame 140.

First, the embodiment illustrated in FIGS. 6-6C does not include the mounting plate 150. Instead, in this embodiment, the mounting brackets 156, which are configured to receive the mounting brackets 143 of the bucket lift frame 140, are disposed directly on the frame rods 112 of the main support frame 110. The bucket lift frame 140 is pivotably mounted to the main support frame by the mounting brackets. Also, the bucket lift frame 140 has a different design from that described above in that the bucket lift frame 140 includes a pair of parallel lift frame rods 241 connected by a perpendicularly disposed connecting rod 242.

Second, the design of the bucket control mechanism 170 is different from that in the previously described embodiments. The bucket control mechanism 170 includes a bucket dump lever including a pair of parallel disposed bucket dump arms 274 and a handle 275 disposed between and connecting the bucket dump arms 274. The handle 275 is configured to be actuated by a user. Also, an additional pull handle 200 is disposed between the pair of bucket dump arms 274 at a distance spaced from the handle 275.

The bucket dump arms 274 are each mounted to the connecting rod 242 by a pair of mounting brackets 201. A bracket pivot pin 201a extends through the mounting brackets 201 and the bucket dump arms 274 to pivotably mount the bucket dump arms 274 to the bucket lift frame 140. Locking collars 204 are disposed at each end of the bracket pivot pins 201a.

The bucket control arm 170 is mounted between the bucket dump arms 274 by a pivot pin sleeve 202 having a control arm pivot pin 205 extending through the pivot pin sleeve 202. Lock collars 206 are disposed at each end of the control arm pivot pin 205.

The material loading apparatus 100A illustrated in FIGS. 6-6C functions similarly to apparatus 100 described above. That is, once the material loading apparatus 100A is in the material dumping position (e.g., see FIG. 5C) the user, but actuating the handle 275, pushes the bucket dump arms 274 forward and pivots them with respect to the mounting brackets 201. The handle 175 is configured to be moved manually by a user applying a pushing or pulling force on. This forward motion of the bucket dump arms 274 causes the bucket control arm 170 to move forward and, by pivoting motion, tilt the bucket 130 into the dumping position illustrated in FIG. 5C. The bucket 130 is returned to its position in FIG. 5B but pulling the handle 275 back to its initial position.

As noted above, FIGS. 7A-7D illustrate another alternate embodiment, in which the bucket control arms 170 are replaced with a pair of cables and pulleys. Some of the features in this alternate embodiment are the same as those in the previous embodiments discussed with reference to FIGS. 1-6C. Description of these features is omitted for brevity and, where appropriate, the same reference numbers are used. Referring to FIGS. 7A-7D, a pulley 304 is attached to the bucket lift frame 140 on the connecting arm 242, which is the axis for the pulley 304. A lower cable 301 connects to bucket 130 at the mounting bracket 172 with cable clamp 301a. Another cable clamp 301b connects the lower cable 301 to a turnbuckle 302. The turnbuckle 302 is installed to allow the cable length of the lower cable 301 to be adjustable by the user.

An upper cable clamp 303a connects the turnbuckle 302 to an upper cable 303 such that the turnbuckle 302 is disposed between the upper cable 303 and the lower cable 301, which are each connected to respective ends to the turnbuckle 302. The upper cable 303, at an end opposite to that attached to the turnbuckle 302, is attached to the pulley 304. A metal flatbar (stationary dump handle) 305 is attached to the pulley 304 with two stationary bolts 304a/304b.

The other end of the stationary dump handle 305 has an elongated slot 305a, approximately 3 inches long, that does not breach the end of the stationary dump handle 305. A dump handle sleeve 306 fits over the end of the stationary dump handle 305 with a pin 306a, that extends through the dump handle sleeve 306 and that fits through the slot 305a. A dump handle sleeve grip 306b is mounted perpendicular to the top of the dump handle sleeve 306 to grasp when depressing or extending the dump handle sleeve 306. A length of the dump handle sleeve 306, when depressed toward the pulley 304, is short enough to move upward and downward in front of the handle 114. Additionally, the length of the dump handle sleeve 306, when extended, is long enough to reach underneath and past the handle 114 to lock the bucket 130 in the upright position. A portion of the upper cable assembly (301-303a) is retracted onto the pulley 304.

The weight of the bucket 130 and its load stabilizes the dump handle assembly under the handle 114. To dump the bucket 130, a user grips the pulley sleeve handle grip 306b and slides the pulley sleeve handle grip 306b toward the pulley 304 until it clears handle 114, allowing the entire assembly to rotate forward thus unwinding the cable 301/303, which allows the bucket 130 to tilt forward.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A material handling apparatus, comprising:
a frame, comprising:
a main support frame; and
a bucket lift frame pivotably mounted on the main support frame;
a bucket pivotably secured to the frame;
a bucket control member secured to the bucket and configured to move the bucket from a loading position to a dumping position; and
a ratchet column mounted on the frame and configured to allow a user to manually change a height of the bucket,
wherein the bucket lift frame is configured to lift and lower the bucket to be held at various heights.

2. The material handling apparatus according to claim 1, wherein the ratchet column comprises:
two parallel column members, each of the parallel column members having a plurality of vertically separated grooves, the grooves being configured to receive an engagement pin of the frame.

3. The material handling apparatus according to claim 1, further comprising a pair of steerable wheels mounted on the frame.

4. A material handling apparatus, comprising:
a frame, comprising:
a main support frame; and
a bucket lift frame pivotably mounted on the main support frame;
a bucket pivotably secured to the frame; and
a bucket control member secured to the bucket and configured to move the bucket from a loading position to a dumping position,
wherein the bucket lift frame is configured to lift and lower the bucket to be held at various heights,
wherein the bucket lift frame comprises:
a pair of parallel lift frame rods each connected to the bucket; and
a cross bar perpendicularly disposed between and connecting the pair of parallel lift frame rods.

5. The material handling apparatus according to claim 1, further comprising a bucket control mechanism secured to the frame, the bucket control mechanism comprising:
a handle pivotably mounted to the frame; and
a bucket control arm having a first end connected to the bucket and a second end connected to the handle,
wherein the control mechanism is configured to move the loading bucket from a loading position to a dumping position.

6. The material loading apparatus according to claim 1, further comprising a ratchet release mechanism configured to release the ratchet column.

7. A material handling apparatus, comprising:
a frame, comprising:
a main support frame; and
a bucket lift frame pivotably mounted on the main support frame;
a bucket pivotably secured to the frame;
a bucket control member secured to the bucket and configured to move the bucket from a loading position to a dumping position;
a pair of steerable wheels mounted on the frame; and
an axle supporting the pair of steerable wheels,
wherein the main support frame is secured to the axle, and
wherein the bucket lift frame is configured to lift and lower the bucket to be held at various heights.

8. A material handling apparatus, comprising:
a frame, comprising:
a main support frame; and
a bucket lift frame pivotably mounted on the main support frame;
a bucket pivotably secured to the frame;
a bucket control member secured to the bucket and configured to move the bucket from a loading position to a dumping position;
a pair of steerable wheels mounted on the frame; and
an axle supporting the pair of steerable wheels,
wherein the ratchet column is secured to the axle and extends vertically from the axle, and
wherein the bucket lift frame is configured to lift and lower the bucket to be held at various heights.

9. The material handling apparatus according to claim 2, wherein each of the two parallel column members has a mounting hole configured to mount the two parallel column members to the axle such that the axle extends through the mounting holes, which are formed at a bottom end of the two parallel column members.

10. The material handling apparatus according to claim 9, wherein the axle is loosely received within the mounting holes to allow the ratchet column to freely pivot about the axle.

11. A material handling apparatus, comprising:
a frame, comprising:
a main support frame; and
a bucket lift frame pivotably mounted on the main support frame;
a bucket pivotably secured to the frame;
a bucket control member secured to the bucket and configured to move the bucket from a loading position to a dumping position; and
a mounting plate slidably secured to the main support frame,
wherein the bucket lift frame is configured to lift and lower the bucket to be held at various heights.

12. The material handling apparatus according to claim 11, wherein the main support frame comprises a pair of parallel frame rods, and
wherein the mounting plate comprises a rectangular, flat plate body, which extends across the main support frame and is secured to both of the pair of parallel frame rods.

13. The material handling apparatus according to claim 12, wherein the mounting plate includes a pair of mounting plate brackets configured to respectively receive one of a pair of mounting brackets of the bucket lift frame such that the mounting brackets engage the mounting plate brackets in a manner that allows the bucket lift frame to pivot with respect to the main support frame.

14. The material handling apparatus according to claim 2, wherein the engagement pin is releasably received in the grooves.

15. The material handling apparatus according to claim 1, wherein the bucket lift frame is mounted at a first end to the main support frame and at a second end, opposite to the first end, to the bucket.

16. The material handling apparatus according to claim 1, wherein the bucket lift frame is mounted at a first end to the main support frame and at a second end, opposite to the first end, directly to a rear surface of the bucket.

* * * * *